(12) United States Patent
Kim et al.

(10) Patent No.: US 11,651,069 B2
(45) Date of Patent: *May 16, 2023

(54) METHOD FOR OPERATING AN INTERNET-OF-THINGS SYSTEM

(71) Applicant: SAMSUNG ELECTRONICS CO., LTD., Suwon-si (KR)

(72) Inventors: Joo Hwan Kim, Gyeonggi-do (KR); Bo Gyeong Kang, Gyeonggi-do (KR); Myung Koo Kang, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/377,637

(22) Filed: Jul. 16, 2021

(65) Prior Publication Data
US 2021/0342436 A1 Nov. 4, 2021

Related U.S. Application Data

(63) Continuation of application No. 16/055,997, filed on Aug. 6, 2018, now Pat. No. 11,074,335.

(30) Foreign Application Priority Data

Sep. 21, 2017 (KR) .......................... 10-2017-0121671
Feb. 28, 2018 (KR) .......................... 10-2018-0024337

(51) Int. Cl.
G06F 21/45 (2013.01)
G06F 21/44 (2013.01)
(Continued)

(52) U.S. Cl.
CPC .............. *G06F 21/45* (2013.01); *G06F 21/44* (2013.01); *H04L 41/022* (2013.01);
(Continued)

(58) Field of Classification Search
CPC .. G06F 21/45; G06F 21/44; G06F 2221/2117; H04W 4/70; H04W 12/71;
(Continued)

(56) References Cited

U.S. PATENT DOCUMENTS 9,693,356 B1 6/2017 Ren et al.
2014/0244834 A1 8/2014 Guedalia et al.
(Continued)

FOREIGN PATENT DOCUMENTS

| KR | 10-2016-0069612 | 6/2016 |
| KR | 10-2017-0046202 | 5/2017 |
| KR | 10-2017-0075333 | 7/2017 |

OTHER PUBLICATIONS

Office Action dated Jul. 1, 2021 in corresponding Korean Application No. 10-2018-0024337, 7 pages (in Korean).

*Primary Examiner* — Michael S McNally
(74) *Attorney, Agent, or Firm* — F. Chau & Associates, LLC

(57) ABSTRACT

A method for operating an Internet of Things (IoT) system includes obtaining, by a device registration tool, identification information of a first IoT module, obtaining, by the device registration tool, identification information of a device with the first IoT module mounted thereon, and registering, by the device registration tool, the identification information of the first IoT module and the identification information of the device in a database accessible by an IoT network.

15 Claims, 14 Drawing Sheets

(51) Int. Cl.
*H04L 67/12* (2022.01)
*H04L 41/022* (2022.01)
*H04L 65/1073* (2022.01)
*H04L 41/0853* (2022.01)
*H04L 41/12* (2022.01)
*H04W 4/70* (2018.01)
*H04W 12/069* (2021.01)
*H04W 12/71* (2021.01)
*H04L 67/51* (2022.01)

(52) U.S. Cl.
CPC .......... *H04L 41/0856* (2013.01); *H04L 41/12* (2013.01); *H04L 65/1073* (2013.01); *H04L 67/12* (2013.01); *H04L 67/51* (2022.05); *H04W 4/70* (2018.02); *H04W 12/069* (2021.01); *H04W 12/71* (2021.01); *G06F 2221/2117* (2013.01)

(58) Field of Classification Search
CPC ...... H04W 12/609; H04L 67/51; H04L 67/12; H04L 41/022; H04L 41/0856; H04L 65/1073
USPC .......................................................... 726/6
See application file for complete search history.

(56) References Cited

U.S. PATENT DOCUMENTS

| | | |
|---|---|---|
| 2015/0222621 A1 | 8/2015 | Baum et al. |
| 2016/0285979 A1 | 9/2016 | Wang et al. |
| 2017/0005820 A1 | 1/2017 | Zimmerman et al. |
| 2017/0124853 A1 | 5/2017 | Mehta et al. |
| 2017/0180380 A1 | 6/2017 | Bagasra |
| 2017/0223048 A1 | 8/2017 | Kaladgi et al. |
| 2018/0044896 A1 | 2/2018 | Fletcher |
| 2018/0285234 A1 | 10/2018 | Degaonkar et al. |
| 2019/0068592 A1 | 2/2019 | Mattela et al. |
| 2019/0087568 A1 | 3/2019 | Kim et al. |

METHOD FOR OPERATING AN INTERNET-OF-THINGS SYSTEM

CROSS-REFERENCE TO RELATED APPLICATION(S)

This application is a continuation application of U.S. patent application Ser. No. 16/055,997 filed Aug. 6, 2018, which claims priority under 35 U.S.C. § 119 to Korean Patent Application Nos. 10-2017-0121671 and 10-2018-0024337, filed on Sep. 21, 2017 and Feb. 28, 2018, respectively, in the Korean Intellectual Property Office, the disclosures of which are incorporated by reference herein in their entireties.

TECHNICAL FIELD

Exemplary embodiments of the inventive concept relate to a method for operating an Internet of Things system.

DISCUSSION OF RELATED ART

Internet of Things (IoT) is a technique capable of controlling devices with an IoT module mounted thereon through an IoT network, and sharing data collected by the devices to provide various functions. In an IoT system, the devices may transmit and receive, as well as share, data through the IoT network, and the devices may be controlled through the IoT network, so high security may be required. Thus, when the devices with the IoT module mounted thereon are connected to the IoT network, a predetermined authentication procedure may be required. When a manufacturer of the IoT module and manufacturers of devices with the IoT module mounted thereon are different from each other, the authentication procedure may not be smoothly performed due to compatibility issues, which may affect usability by an end-user.

SUMMARY

According to an exemplary embodiment of the inventive concept, a method for operating an Internet of Things (IoT) system includes obtaining, by a device registration tool, identification information of a first IoT module, obtaining, by the device registration tool, identification information of a device with the first IoT module mounted thereon, and registering, by the device registration tool, the identification information of the first IoT module and the identification information of the device in a database accessible by an IoT network.

According to an exemplary embodiment of the inventive concept, a method for operating an Internet of Things (IoT) system includes receiving, by a device registration tool, a registration request for a device with an IoT module mounted thereon, storing, by the device registration tool, identification information of the IoT module and identification information of the device in a database, searching, by the database, identification information of the device and the identification information of the IoT module mounted on the device in the database, when an authentication request is received from the device to be connected to an IoT network, and setting, by the database, communications with the device using a search result.

According to an exemplary embodiment of the inventive concept, a method for operating an Internet of Things (IoT) system includes receiving, by a first database, a registration request for a device with a first IoT module mounted thereon by a first database, storing, by the first database, identification information of the first IoT module and identification information of the device, transmitting, by a second database, identification information of a new device and identification information of a second IoT module mounted on the new device to the first database, when the second database receives an authentication request from the new device to be connected to an IoT network, where the second database is different from the first database, searching, by the first database, the identification information of the new device and the identification information of the second IoT module mounted on the new device, and transmitting, by the first database, a search result to the second database, and setting, by the second database, communications with the new device using the search result.

BRIEF DESCRIPTION OF DRAWINGS

The above and other features of the present inventive concept will be more clearly understood by describing in detail exemplary embodiments thereof with reference to the accompanying drawings.

DETAILED DESCRIPTION OF THE EMBODIMENTS

Figure 1:
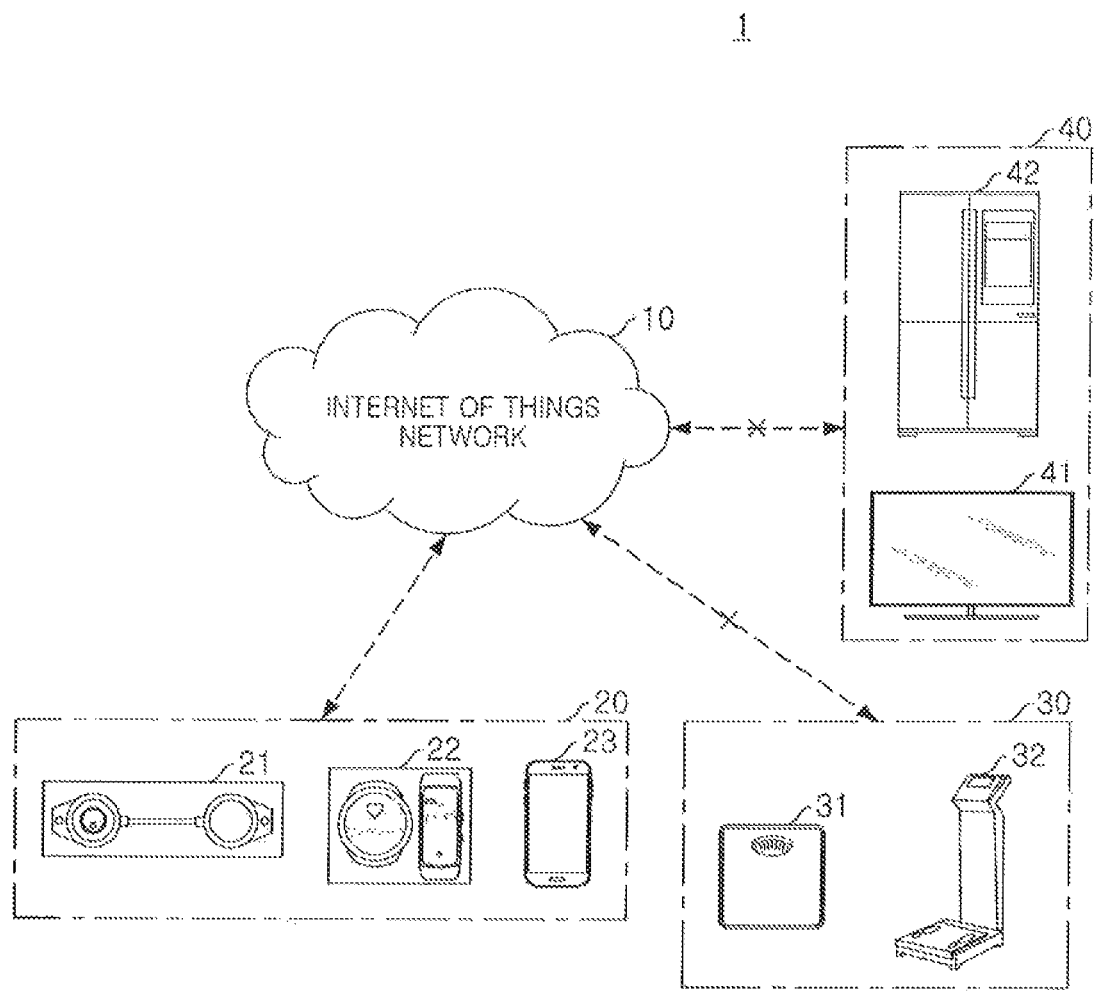
FIGS. 1 to 3 are views illustrating an Internet of Things (IoT) system according to an exemplary embodiment of the inventive concept.

Exemplary embodiments of the inventive concept provide a method for operating an Internet of Things (IoT) system capable of improving convenience of a consumer purchasing an IoT module or devices, produced and provided by various manufacturers, by providing a tool for registering the IoT module or devices to be connected to an IoT network.

Hereinafter, exemplary embodiments of the present inventive concept will be described in detail with reference to the accompanying drawings. Like reference numerals may refer to like elements throughout this application.

Figure 2:
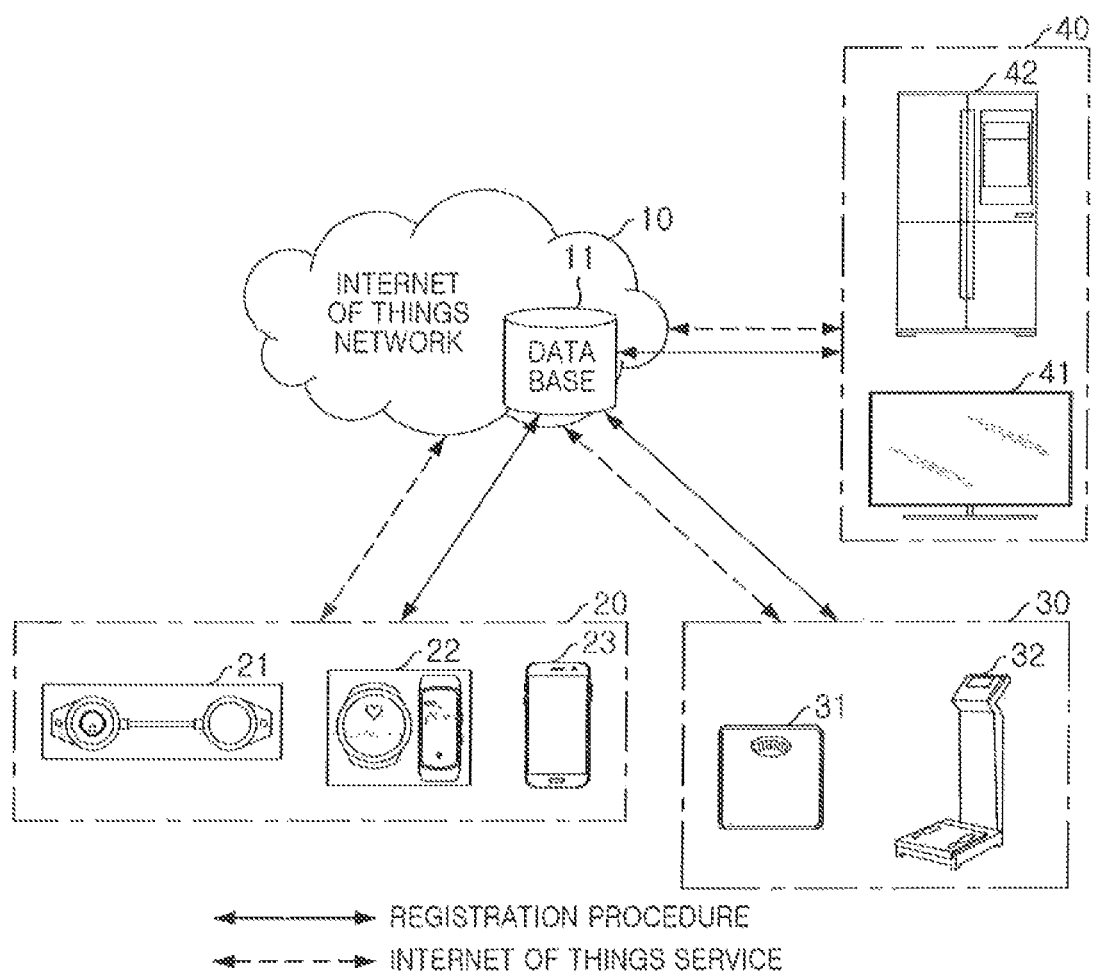
Figure 3:
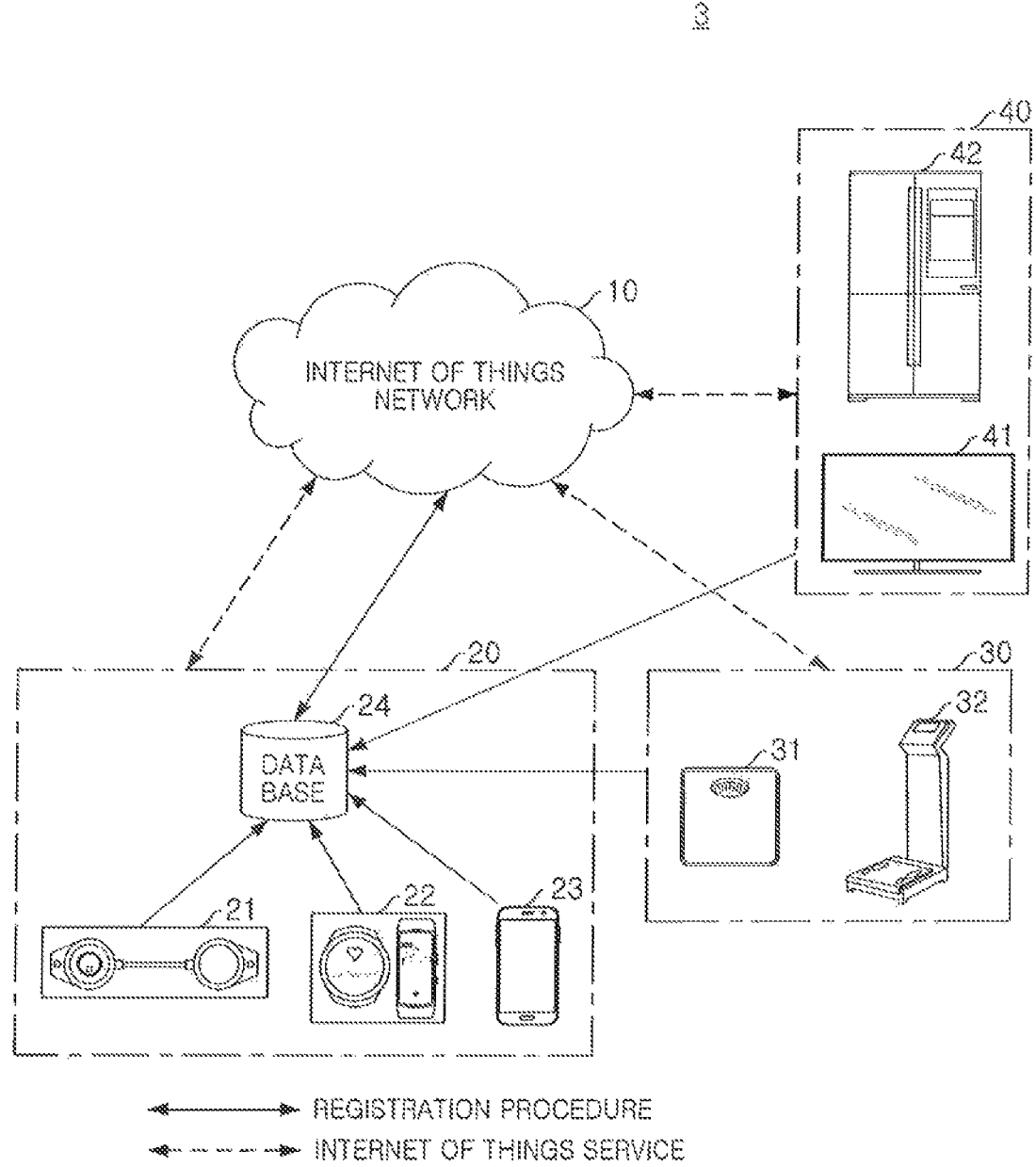

FIGS. 1 to 3 are views illustrating an IoT system according to an exemplary embodiment of the inventive concept.

First, referring to FIG. 1, an IoT system 1 may include a plurality of devices 21 to 23, 31 and 32, and 41 and 42, as well as an IoT network 10 for mediating communications between the plurality of devices 21 to 23, 31 and 32, and 41 and 42. The IoT network 10 may mediate communications between the plurality of devices 21 to 23, 31 and 32, and 41 and 42, while providing cloud services, or the like.

In the plurality of devices 21 to 23, 31 and 32, and 41 and 42, an IoT module, having a communications function with the IoT network 10 and data storage and processing functions, may be mounted. The IoT module may include a processor responsible for operation processing and data processing functions, a memory for data storage, a sensor for collecting peripheral information, a communications unit, or the like. For example, an IoT module, included in a wearable device 22, may include a sensor for detecting a body temperature, a heart rate, skin moisture, or the like, of a user wearing the wearable device 22. A refrigerator 42 may include a sensor for measuring internal temperature, humidity, or the like.

In an exemplary embodiment of the inventive concept, a module manufacturer, producing and providing an IoT module, may be different from device manufacturers 20 to 40, producing and providing the plurality of devices 21 to 23, 31 and 32, and 41 and 42. In other words, after the device manufacturers 20 to 40 purchase an IoT module from the module manufacturer, various devices 21 to 23, 31 and 32, and 41 and 42 may be manufactured using the IoT module that was purchased. For example, in the IoT system 1 illustrated in FIG. 1, a first device manufacturer 20 may be a company, producing a biometric information measuring device 21, the wearable device 22, an IT device, such as a smartphone 23, or the like, while the second device manufacturer 30 may be a company, producing a weight scale 31, a body information measuring machine 32, or the like. Meanwhile, a third device manufacturer 40 may be a company, producing household appliances such as a television 41, the refrigerator 42, or the like.

As described above, the device manufacturers 20 to 40, producing and providing the devices 21 to 23, 31 and 32, and 41 and 42, on which an IoT module is mounted, are varied, and types of the devices 21 to 23, 31 and 32, and 41 and 42, produced and provided thereby, are also varied. Thus, there may be problems in scalability of the IoT system 1.

For example, the first device manufacturer 20 may be a module manufacturer that produces an IoT module and manages the IoT network 10. In this case, devices 31 and 32, produced and provided by the second device manufacturer 30, and devices 41 and 42, produced and provided by the third device manufacturer 40, may not be registered in the IoT system 1, even when the IoT module is mounted thereon. Thus, to expand scalability of the IoT system 1, whenever a device is purchased by a user, the user may have to search for a device compatible with an existing system, or may directly perform an authentication procedure with respect to a device. The process described above may result in reduced scalability of the IoT system 1.

In an exemplary embodiment of the inventive concept, a module manufacturer provides a device registration tool, for performing a registration procedure of a device, to the device manufacturers 20 to 40 purchasing an IoT module together with the device, to resolve the above-described scalability issues. Hereinafter, a description of the device registration tool will be provided with reference to FIGS. 2 and 3.

First, referring to FIG. 2, an IoT system 2 according to an exemplary embodiment of the inventive concept may include the IoT network 10, and the plurality of devices 21 to 23, 31 and 32, and 41 and 42. The IoT network 10 may include a database 11. The database 11 may store data required for an overall operation of the IoT system 2, and may store identification information required to perform an authentication procedure with respect to the plurality of devices 21 to 23, 31 and 32, and 41 and 42.

The device manufacturers 20 to 40 may purchase an IoT module, and may produce and provide the plurality of devices 21 to 23, 31 and 32, and 41 and 42 with the IOT module mounted therein. The device manufacturers 20 to 40 may perform a registration procedure for storing identification information of the plurality of devices 21 to 23, 31 and 32, and 41 and 42 with identification information of the IoT module in the database 11, before providing the plurality of devices 21 to 23, 31 and 32, and 41 and 42. The registration procedure may be performed by a device registration tool provided by a module manufacturer that produces and provides the IoT module. In an exemplary embodiment of the inventive concept, the device registration tool may be a software program to be operated on a computer.

For example, the first device manufacturer 20 may receive the device registration tool while purchasing the IoT module from the module manufacturer. The first device manufacturer 20 may store identification information of the devices 21 to 23 and identification information of the IoT module in the database 11 using the device registration tool, before providing the devices 21 to 23 with the IoT module mounted therein. When the devices 21 to 23, purchased by users, transmit an authentication request to the IoT network 10, the IoT network 10 may authorize an authentication request with respect to the devices 21 to 23, using identification information of the devices 21 to 23, pre-stored in the database 11, and identification information of the IoT module. Thus, various devices 21 to 23, 31 and 32, and 41 and 42 may be purchased by users from the device manufacturers 20 to 40, and may be easily connected to the IoT network 10. In this case, the scalability of the IoT system 2 may be significantly increased.

Next, referring to FIG. 3, an IoT system 3 according to an exemplary embodiment of the inventive concept, may include the IoT network 10, and the plurality of devices 21 to 23, 31 and 32, and 41 and 42. In FIG. 3, the first device manufacturer 20 may be a module manufacturer producing and providing an IoT module, and may operate a database 24. The database 24 may store identification information required to perform an authentication procedure with respect to the plurality of devices 21 to 23, 31 and 32, and 41 and 42. The first device manufacturer 20 may perform a registration procedure for storing identification information of the devices 21 to 23 and the IoT module in the database 24, in an operation of producing the devices 21 to 23 with the IoT module mounted therein.

In a manner similar to FIG. 2, the device manufacturers 30 and 40 may purchase the IoT module, and may produce and provide the plurality of devices 31 and 32 and 41 and 42 with the IOT module mounted therein. The device manufacturers 30 and 40 may perform a registration procedure for storing identification information of the plurality of devices 31 and 32 and 41 and 42 with identification information of the IoT module in the database 24, before providing the plurality of devices 31 and 32 and 41 and 42. The registration procedure may be performed by a device registration tool provided by the first device manufacturer 20. In an exemplary embodiment of the inventive concept, the device registration tool may be a software program to be operated on a computer.

For example, the second device manufacturer 30 may receive the device registration tool while purchasing the IoT module from the first device manufacturer 20. The second device manufacturer 30 may store identification information of the devices 31 and 32 and identification information of the IoT module in the database 24 using the device registration tool, before providing the devices 31 and 32 with the IoT module mounted therein.

When the devices 31 and 32, purchased by users, transmits an authentication request to the IoT network 10, the IoT network 10 may determine whether to authorize the authentication request for the devices 31 and 32, by transmitting identification information of the devices 31 and 32 received together with the authentication request to the database 24. Thus, the devices 31 and 32 and 41 and 42 may be purchased through various paths by users, and may be easily connected to the IoT network 10. In this case, the scalability of the IoT system 3 may be significantly increased.

Figure 4:
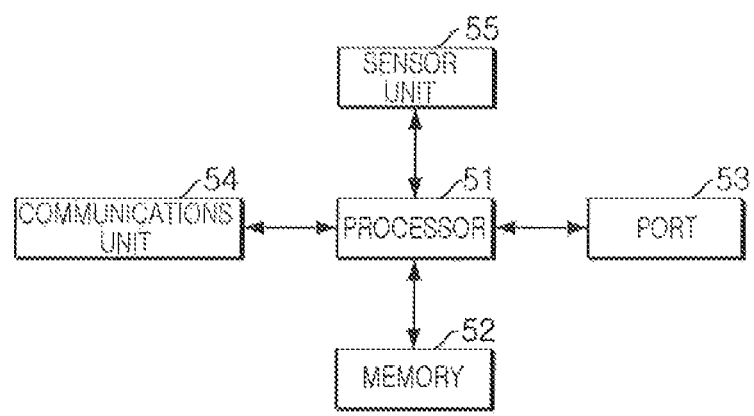
FIG. 4 is a schematic block diagram illustrating an IoT module according to an exemplary embodiment of the inventive concept.

FIG. 4 is a schematic block diagram illustrating an IoT module according to an exemplary embodiment of the inventive concept.

Referring to FIG. 4, an IoT module 50 according to an exemplary embodiment of the inventive concept, may include a processor 51, memory 52, a port 53, a communications unit 54, and a sensor unit 55. The processor 51 may be an arithmetic processing device processing an overall operation of the IoT module 50.

The memory 52 may store data required for an operation of the IoT module 50, data collected by the sensor unit 55, identification information of the IoT module 50, or the like, and may include devices such as non-volatile memory, dynamic memory, or the like. In an exemplary embodiment of the inventive concept, the identification information may include identification information of a certificate stored in the memory 52, a serial number assigned to the IoT module 50, identification information assigned by an IoT network operator to a module manufacturer, or the like. The port 53 is an interface device for mediating communications between an external device and the IoT module 50, and may provide communications with an external device according to various communications interfaces such as universal asynchronous receiver-transmitter (UART), universal serial bus (USB), inter-integrated circuit (I2C), or the like.

The communications unit 54 may provide a communications function required for the IoT module 50 to be operated after being mounted in a device and connected to an IoT network. The communications unit 54 may send and receive data according to various wired/wireless communication interfaces. The sensor unit 55 may include various types of sensors, such as an acceleration sensor, a global positioning sensor (GPS) sensor, a humidity sensor, a temperature sensor, a gas sensor, a heart rate sensor, or the like. The number and type of sensors, included in the sensor unit 55, may vary according to the type of device in which the IoT module 50 is mounted.

Device manufacturers may receive a device registration tool together with the IoT module 50, when purchasing the IoT module 50 from a module manufacturer. The device registration tool may be a type of software program to be executed on a computer device. The computer device executing the device registration tool may be connected to communicate with the IoT module 50 via the port 53, while the device registration tool may bring identification information of the IoT module 50, stored in the memory 52 of the IoT module 50.

Before a device with the IoT module 50 mounted thereon is provided, identification information of the device may be input to the device registration tool by the device manufacturer. For example, the identification information of the device may include a serial number assigned to the device, a product name of the device, manufacturer identification information provided by a module manufacturer or an IoT service provider to the device manufacturer, or the like. The device registration tool may encode identification information of the device and identification information of the IoT module 50 in a predetermined format, and then may store the information in a database.

The database storing the identification information of the device and the identification information of the IoT module 50 may be a database accessible by a server operating an IoT network. In an exemplary embodiment of the inventive concept, the database may be a database managed by the server and included in an IoT network, or a database managed by a module manufacturer producing and providing the IoT module 50, e.g., as described with reference to FIGS. 2 and 3.

Figure 5:
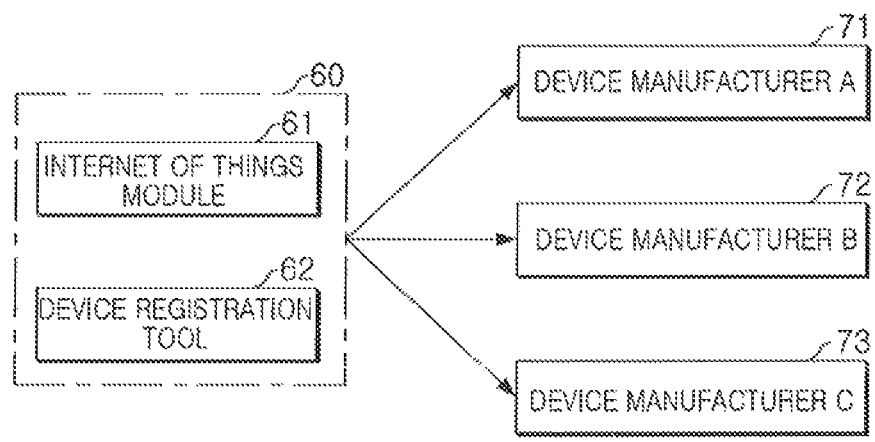
FIG. 5 is a view illustrating a process for manufacturing a device with an IoT module mounted therein according to an exemplary embodiment of the inventive concept.

FIG. 5 is a view illustrating a process for manufacturing a device with an IoT module mounted therein according to an exemplary embodiment of the inventive concept.

Referring to FIG. 5, a module manufacturer 60 may provide an IoT module 61 to various device manufacturers 71 to 73. IoT modules provided by the module manufacturer 60 to the device manufacturers 71 to 73 may be the same as each other or may be different from each other, and the IoT module 61 may be processed during an operation in which the device manufacturers 71 to 73 produce devices.

For a consumer to purchase and use a device without concern for compatibility with an IoT system, devices produced by the device manufacturers 71 to 73 may be provided while being registered in a database accessible by an IoT network. In this case, the consumer may use the device by connecting the device to the IoT system without other authentication and/or registration procedures, e.g., all that is needed is purchasing the device and connecting the device to the IoT network.

In exemplary embodiments of the inventive concept, by a device registration tool 62 provided by the module manufacturer 60, identification information of the IoT module 61 and identification information of devices with the IoT module 61 mounted therein may be registered in advance in a database before a device is provided. According to exemplary embodiments of the inventive concept, in an operation in which the module manufacturer 60 produces the IoT module 61, in an operation in which the device manufacturers 71 to 73 purchase a device with the IoT module 61 mounted therein, or the like, at least a portion of the identification information may be registered in the database.

The database may manage the identification information, received through the device registration tool 62, as a type of whitelist. For example, when identification information of a new device connected to the IoT network by a consumer and identification information of the IoT module 61 mounted in the new device are present in the whitelist, authentication with respect to the new device may be granted. Thus, a consumer may easily connect the new device to the IoT system, without separate complex authentication and/or registration procedures.

Figure 6:
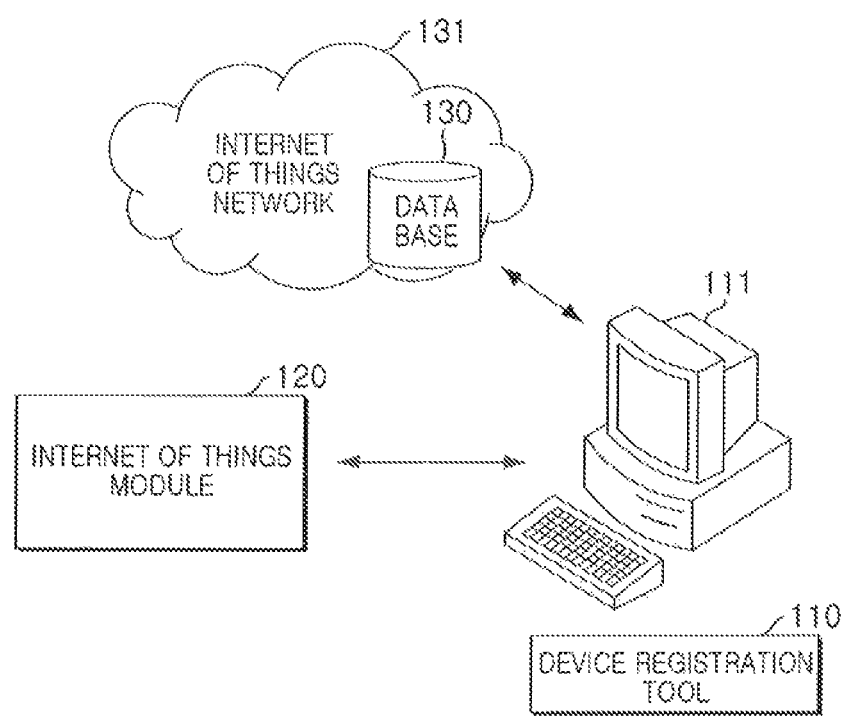
FIGS. 6 to 8 are views illustrating a registration procedure of a device according to an exemplary embodiment of the inventive concept.
Figure 7:
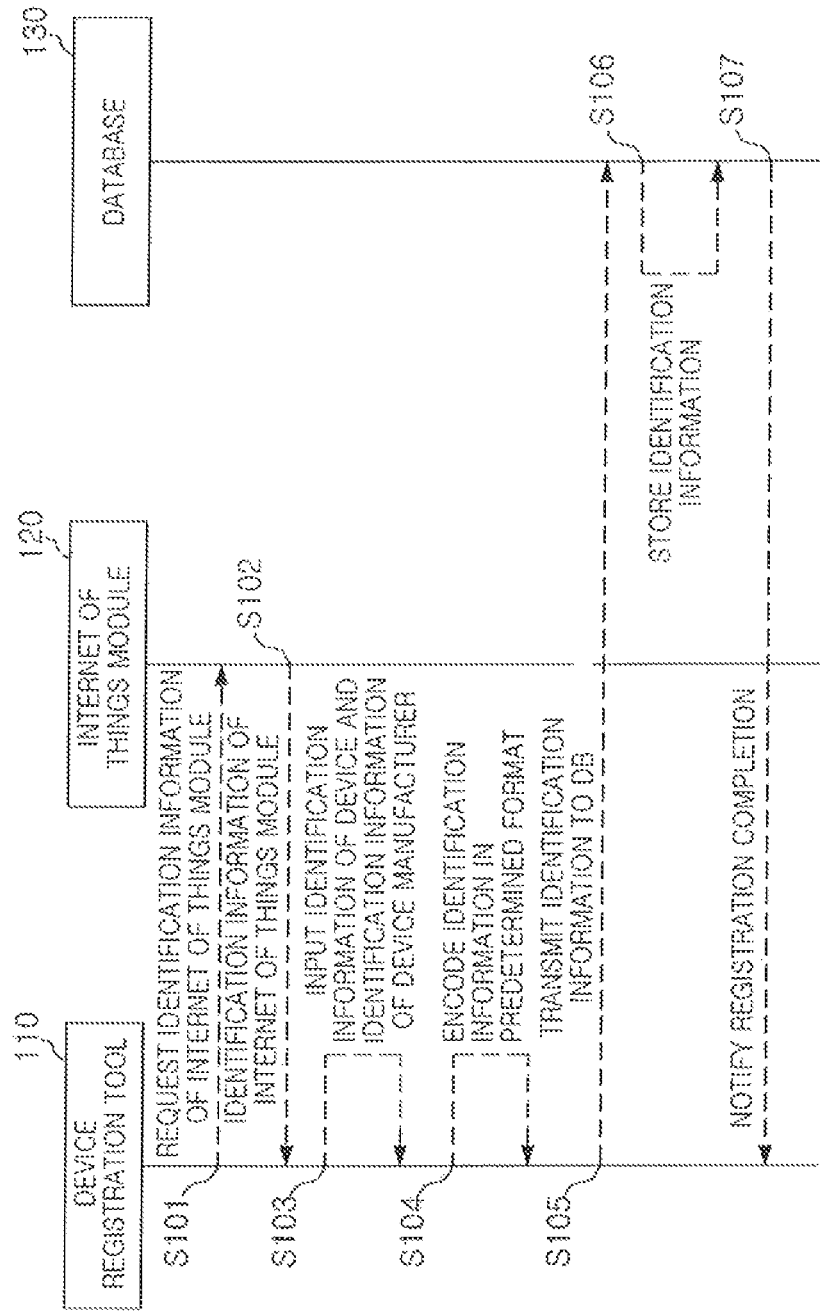
Figure 8:
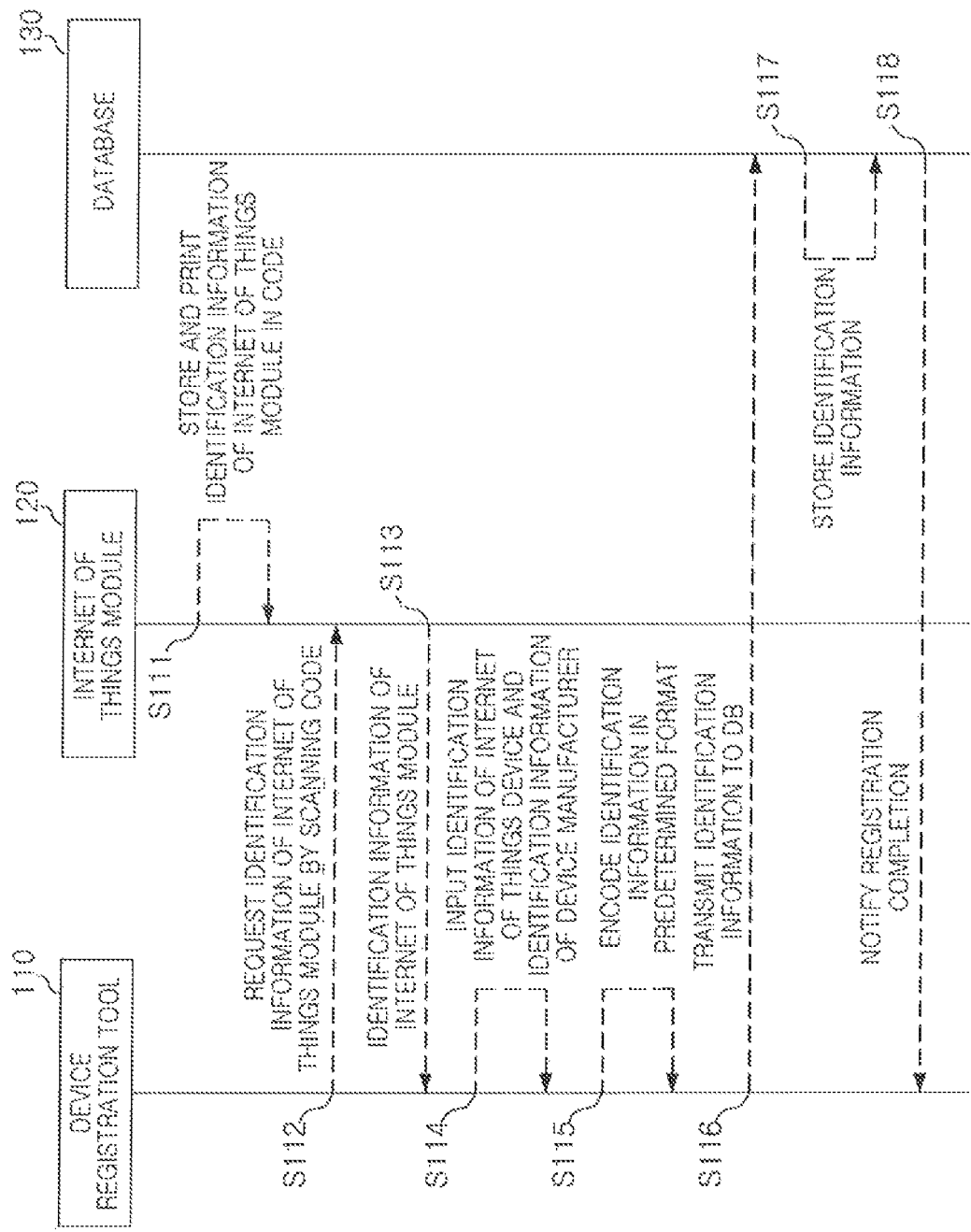

FIGS. 6 to 8 are views illustrating a registration procedure of a device according to an exemplary embodiment of the inventive concept.

Referring to FIG. 6, a computer device 111 and an IoT module 120 may be connected to communicate with each other, and a device registration tool 110 may be executed in the computer device 111. The device registration tool 110 is a type of software program, and may be provided by a module manufacturer producing the IoT module 120 to a device manufacturer purchasing the IoT module 120 and producing a device with the IoT module 120 mounted therein.

The device manufacturer may extract identification information of the IoT module 120 using the device registration tool 110. Moreover, the device manufacturer may input identification information of a device, in which the IoT module 120 is to be mounted, identification information of the device manufacturer, or the like, using the device registration tool 110. The device registration tool 110 may encode at least a portion of the identification information that is input in a predetermined format, and may transmit the at least a portion to a database 130. The database 130 may be a database included in an IoT network 131, and may be operated and managed by a server.

Hereinafter, a registration procedure of a device according to the present exemplary embodiment will be described in further detail with reference to FIGS. 7 and 8.

First, referring to FIG. 7, a registration procedure of a device according to an exemplary embodiment of the inventive concept, may begin with the device registration tool 110 requesting identification information of the IoT module 120 from the IoT module 120 (S101). The identification information, requested by the device registration tool 110 in S101, may include certificate identification information stored in the IoT module 120, a serial number assigned to the IoT module 120, or the like. The device registration tool 110 may request identification information from the IoT module 120 through various wired/wireless communications methods. In an exemplary embodiment of the inventive concept, a computer device, in which the device registration tool 110 is executed, and the IoT module 120 may communicate in a manner such as USB, UART, I2C, or the like.

The IoT module 120 may transmit the identification information to the device registration tool 110 in response to a request from the device registration tool 110 (S102). Using the device registration tool 110, identification information of a device and/or identification information of a device manufacturer may be input by a device manufacturer (S103). The identification information of the device may include a product name, a serial number assigned to the device, or the like.

The device registration tool 110 may encode at least a portion of the identification information of the IoT module 120 received in S102, the identification information of the device received in S103, and the identification information of the device manufacturer, in a predetermined format (S104). In an exemplary embodiment of the inventive concept, the format may be a format suitable for data transmission, and may further include information for verifying that data has been normally transmitted, in addition to the identification information.

The device registration tool 110 may transmit the identification information, encoded in S104, to the database 130 (S105). The database 130 may be a database storing data required to operate the IoT network 131. The database 130 may store the identification information, received in S105 (S106), and may inform the device registration tool 110 that registration is complete with respect to the device having the IoT module 120 mounted therein (S107).

In an exemplary embodiment of the inventive concept, the process, described above with reference to FIG. 7, may be performed by the device registration tool 110 executed in a computer device. As illustrated previously, the device registration tool 110 may be a type of software program to be executed in a computer device, and may be a program provided to a device manufacturer by a module manufacturer producing the IoT module 120. In other words, a device manufacturer may purchase the IoT module 120, receive the device registration tool 110, and perform the process described with reference to FIG. 7, thus storing identification information of a device with the IoT module 120 mounted therein in the database 130.

In other words, according to an exemplary embodiment of the inventive concept, before the device with the IoT module 120 mounted therein is provided to a consumer (an End-User), a device manufacturer may store identification information of the device in the database 130. Thus, when the consumer purchases the device and connects the device to an IoT network provided by the database 130, an authentication procedure with respect to the device may be automatically performed using identification information stored in the database 130. As a result, the consumer may freely connect the device, which is pre-registered, to the IoT network, without separate authentication and/or registration procedures, thus increasing scalability and convenience of an IoT system.

Next, referring to FIG. 8, in an exemplary embodiment of the inventive concept, identification information of the IoT module 120 may be stored in a two-dimensional code (a QR code, a barcode, or the like), printed on the IoT module 120 (S111). In an exemplary embodiment of the inventive concept, a module manufacturer may reflect certificate identification information of the IoT module 120, a serial number assigned to the IoT module 120, or the like, in the two-dimensional code, and may print the two-dimensional code corresponding thereto on the IoT module 120, when producing the IoT module 120.

A device manufacturer may scan the two-dimensional code printed on the IoT module 120, to request identification information of the IoT module 120 (S112). The device registration tool 110 may receive the identification information from the IoT module 120 from scanning the two-dimensional code (S113), and may input the identification information of a device in which the IoT module 120 is to be mounted, and/or identification information of a device manufacturer, in addition to the identification information that was received (S114). In other words, operations executed by a computer device (e.g., 111), among the series of operations illustrated in FIG. 8, may be executed by the device manufacturer, operating and managing the computer device. In an exemplary embodiment of the inventive concept, operations executed by the computer device may be executed by the device registration tool 110, which is a software program provided by a module manufacturer producing the IoT module 120.

The device registration tool 110 may encode at least a portion of the identification information received in S113 and identification information received in S114 in a predetermined format (S115), and may transmit the encoded identification information to the database 130 (S116). The database 130 may store the identification information (S117), and may inform the device registration tool 110 of successful registration of the device with the IoT module 120 mounted therein (S118).

Figure 9:
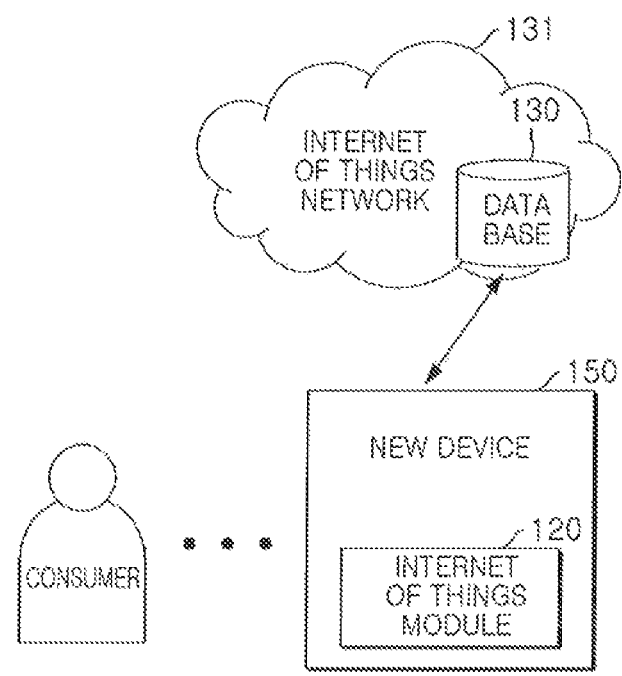
FIGS. 9 to 10 are views illustrating a registration procedure of a new device according to an exemplary embodiment of the inventive concept.
Figure 10:
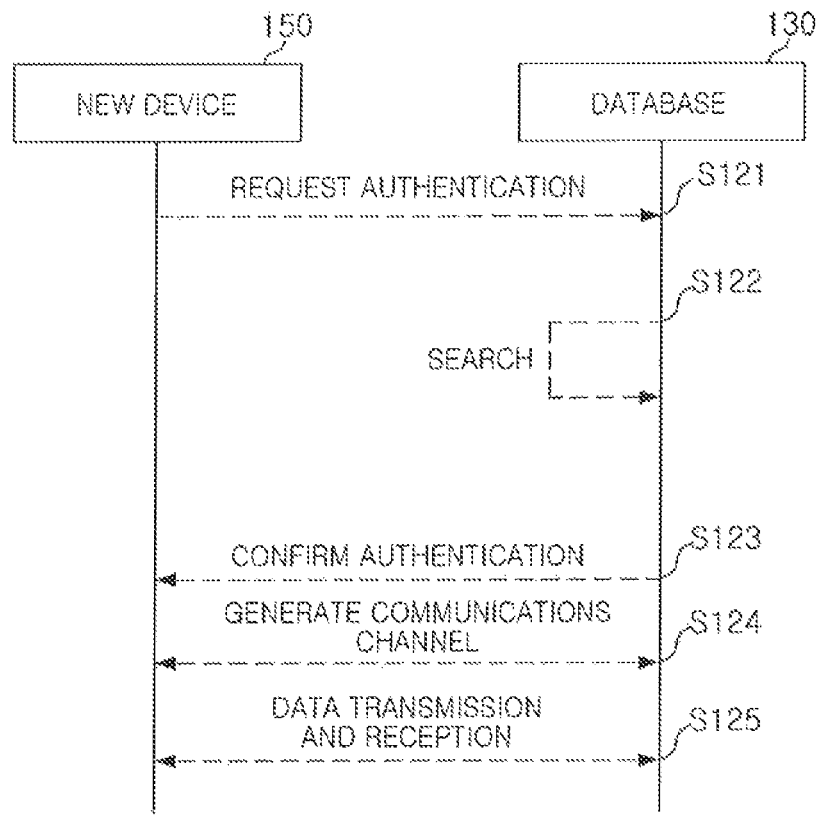

FIGS. 9 to 10 are views illustrating a registration procedure of a new device according to an exemplary embodiment of the inventive concept.

First, referring to FIG. 9, a consumer may perform an authentication request procedure in which a new device 150 is purchased and connected to the IoT network 131. The new device 150 may be a device with the IoT module 120 mounted therein.

The database 130 may store identification information for determining whether the new device 150 is a device registered in the IoT network 131. For example, the database 130 may store identification information collected in the registration procedure according to the exemplary embodiment illustrated with reference to FIGS. 6 to 8.

Referring to FIG. 10, the new device 150 may transmit an authentication request to the database 130 of the IoT network 131 (S121). The authentication request, transmitted to the database 130 in S121, may include identification information of the new device 150, identification information of the IoT module 120 embedded in the new device 150, or the like.

The database 130 may search whether identification information, received together with the authentication request, is present in stored identification information (S122), and may send an authentication confirmation message to the new device 150 (S123). When an authentication confirmation procedure is completed, the database 130 may generate a communications channel between the IoT network 131 and the new device 150 (S124), and transmit and receive data required to provide an IoT service (S125).

Figure 11:
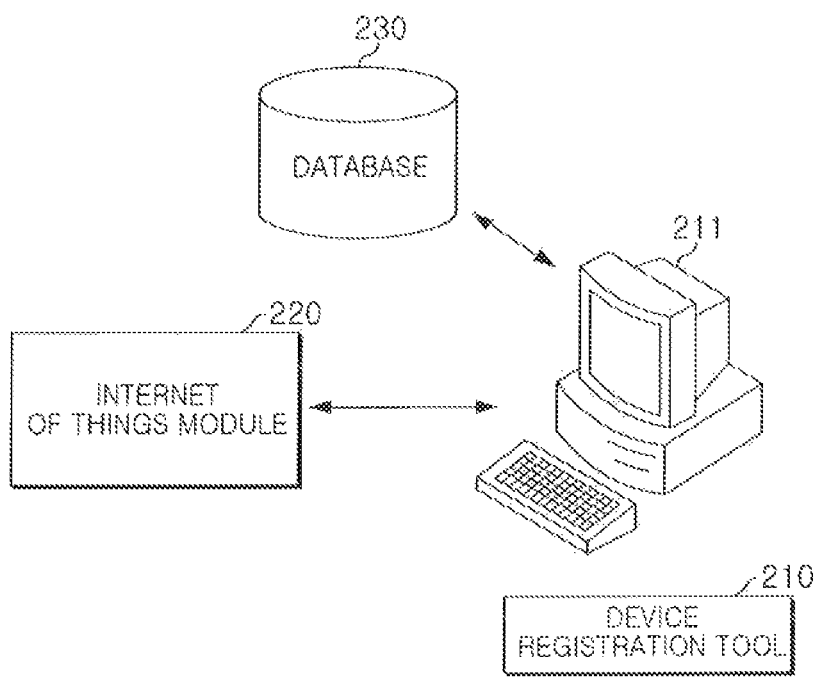
FIGS. 11 to 12 are views illustrating a registration procedure of a device according to an exemplary embodiment of the inventive concept.
Figure 12:
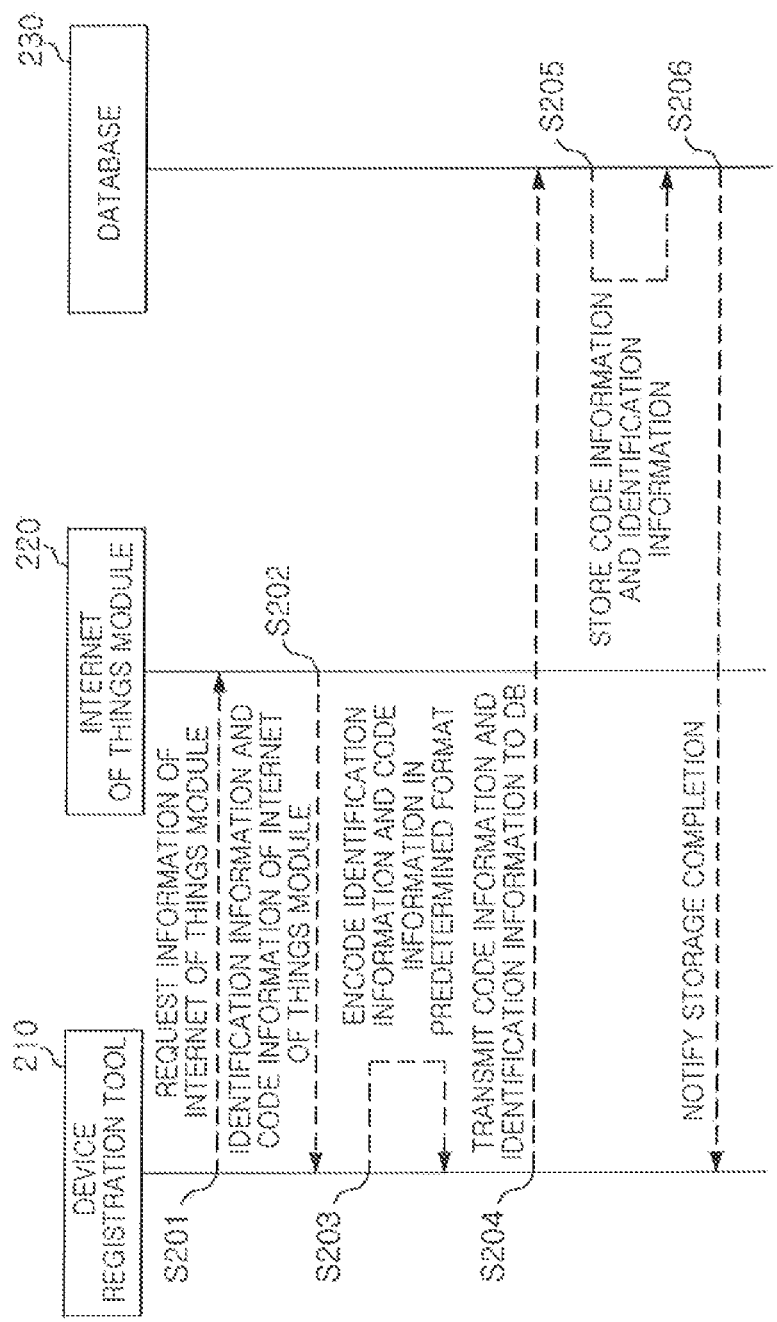

FIGS. 11 to 12 are views illustrating a registration procedure of a device according to an exemplary embodiment of the inventive concept.

Referring to FIG. 11, an IoT module 220, to communicate with a computer device 211, may be provided, and a device registration tool 210 may be executed in the computer device 211. The device registration tool 210 may be a type of software program, while the computer device 211 may be a device operated by a module manufacturer, which produces the IoT module 220, on its own. The computer device 211 may be connected to communicate with a database 230, operated by the module manufacturer.

In FIG. 11, identification information of the IoT module 220, produced by the module manufacturer, may be stored in the database 230 by the device registration tool 210. A device manufacturer, purchasing the IoT module 220 and producing a device, may be connected to the database 230, operated by the module manufacturer, and receive the identification information of the IoT module 220. Accordingly, the device manufacture may perform a registration procedure of the device with the IoT module 220 mounted therein using the identification information. In other words, in FIG. 11, the identification information of the IoT module 220 may not be stored directly in a memory of the IoT module 220, purchased by a device manufacturer. Hereinafter, the registration procedure will be described in further detail with reference to FIG. 12.

First, referring to FIG. 12, the device registration tool 210 may request information of the IoT module 220 from the IoT module 220 (S201). The information, requested by the device registration tool 210 in S201, may include certificate identification information stored in the IoT module 220, a serial number assigned to the IoT module 220, code information included in the IoT module 220, or the like. The code information may be a two-dimensional code information such as QR code information, barcode information, or the like.

The device registration tool 210 may receive the identification information and code information of the IoT module 220 from the IoT module 220, in response to a request of S201 (S202). The device registration tool 210 may encode the identification information and the code information, received in S202, in a predetermined format (S203), and may transmit the encoded information to the database 230 operated by the module manufacturer (S204). As described previously, the database 230 may be a database directly operated and managed by the module manufacturer that produces the IoT module 220. Thus, in FIG. 12, the device registration tool 210, collecting the identification information and the code information of the IoT module 220 and transmitting the same to the database 230, may also be executed in a computer device (e.g., 211) directly operated and managed by the module manufacturer.

The database 230 may store the information received in S204 (S205), and may inform the device registration tool 210 of storage of the code information and the identification information of the IoT module 220 (S206). An operator, operating and managing the device registration tool 210, may confirm that code information and identification information of the IoT module 220 are successfully stored in the database 230 through notification in S206. The code information and the identification information of the IoT module 220, stored in the database 230, may be transmitted to a device manufacturer by a request of the device manufacturer that manufactures a device with the IoT module 220 mounted therein. In other words, identification information may not be stored locally in the IoT module 220 purchased for manufacturing a device by a device manufacturer.

Figure 13:
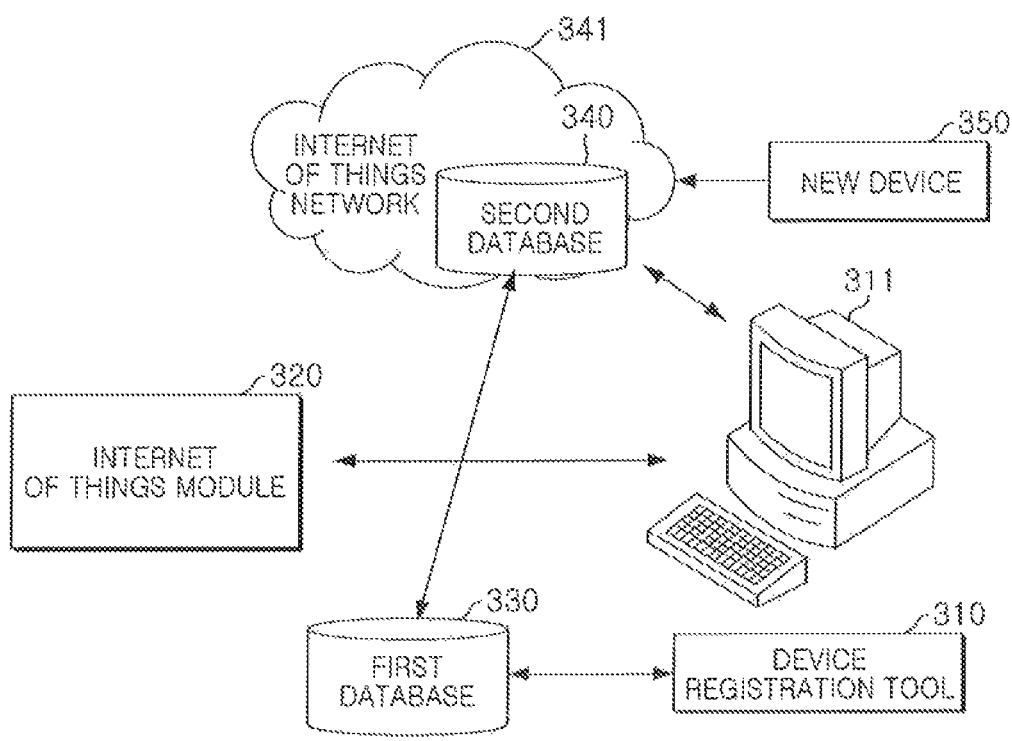
FIGS. 13 to 14 are views illustrating authentication and registration procedures of a device according to an exemplary embodiment of the inventive concept.
Figure 14:
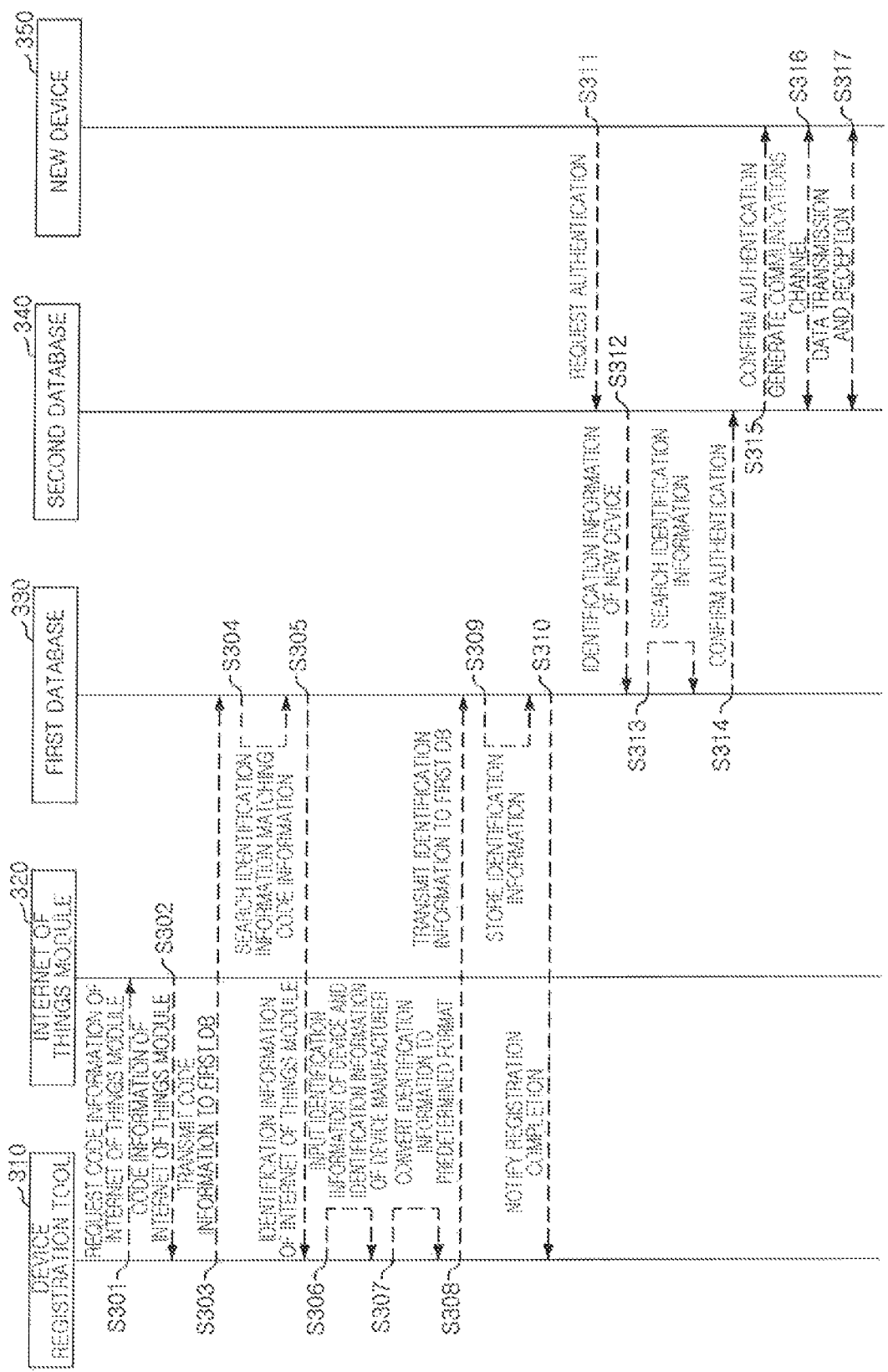

FIGS. 13 to 14 are views illustrating authentication and registration procedures of a device according to an exemplary embodiment of the inventive concept.

Referring to FIG. 13, an IoT module 320, to communicate with a computer device 311, may be provided, and a device registration tool 310 may be executed in the computer device 311. The device registration tool 310 is a type of software program, and may be provided by a module manufacturer producing the IoT module 320 to a device manufacturer producing a device with the IoT module 320 mounted therein. In other words, in FIG. 13, the computer device 311 may be a computer operated by the device manufacturer. The computer device 311 may be connected to communicate with a first database 330, operated by the module manufacturer. As illustrated with reference to FIGS. 11 and 12, by an authentication procedure performed by the module manufacturer, identification information of the IoT module 320 and information of a two-dimensional code (for example, a QR code or a barcode) printed on the IoT module 320 may be stored in the first database 330.

In FIG. 13, the first database 330 may communicate with a second database 340 connected to a IoT network 341. The second database 340 may be a database managed by a server operating the IoT network 341, or the like, and may communicate with various devices with the IoT module 320 mounted therein through the IoT network 341.

In FIG. 13, the device manufacturer may purchase the IoT module 320 from the module manufacturer, and may then extract code information by recognizing the two-dimensional code printed on the IoT module 320 using the computer device 311. The code information may be transmitted to the first database 330 by the device registration tool 310, and the first database 330 may search identification information corresponding to the code information, and may transmit the identification information corresponding thereto to the computer device 311. In other words, identification information of the IoT module 320 may not be stored locally in the IoT module 320, purchased by the device manufacturer. Instead, the device manufacturer may receive the identification information of the IoT module 320 from the first database 330, operated by the module manufacturer, by scanning the two-dimensional code included in the IoT module 320. Hereinafter, a further detailed operation will be described with reference to FIG. 14.

Referring to FIG. 14, an operation according to an exemplary embodiment of the inventive concept, may begin with the device registration tool 310 requesting and receiving code information of the IoT module 320 from the IoT module 320 (S301 and S302). According to an exemplary embodiment of the inventive concept, a two-dimensional code, printed on the IoT module 320, is scanned by a code recognition device (a camera, a barcode recognizer, or the like), connected to a computer device (e.g., 311), executing the device registration tool 310, so that the device registration tool 310 may read the code information of the IoT module 320.

The device registration tool 310 may transmit the code information, read from the IoT module 320, to the first database 330 (S303). As described previously, the first database 330 may hold identification information of the IoT module 320 and code information of the IoT module 320, by the registration procedure described with reference to FIGS. 11 and 12. The database 330 may search the identification information, corresponding to the code information received in S303 (S304), and may transmit the identification information of the IoT module 320 to the device registration tool 310 (S305).

The device registration tool 310 may receive the identification information of a device in which the IoT module 320 is mounted, or in which the IoT module 320 is to be mounted, and/or identification information of a device manufacturer (S306). S306 may be performed by the device manufacturer. The device registration tool 310 may encode the identification information received in S305 and the identification information input in S306 in a predetermined format (S307), and may transmit the encode identification information to the first database 330 (S308). The first database 330 may store the encoded identification information received in S308 (S309), and may inform the device registration tool 310 of successful registration of the device with the IoT module 320 mounted therein (S310). In an exemplary embodiment of the inventive concept, the first database 330 may store the identification information received in S308, in addition to the identification information of the IoT module 320, having been previously stored, or may update the identification information of the IoT module 320, having been previously stored, to the identification information received in S308.

In FIGS. 14, S311 to S317 may be operations executed during a process in which a consumer purchases and uses the new device 350 with the IoT module 320 mounted therein. When the consumer connects the new device 350 to the IoT network 341, the new device 350 may send an authentication request to the second database 340, connected to the IoT network 341 (S311). In S311, the new device 350 may send identification information of the new device 350, identification information of the IoT module 320 mounted in the new device 350, or the like, together with the authentication request.

When the authentication request is received, the second database 340 may transmit the identification information, received from the new device 350, to the first database 330 (S312). The first database 330 searches whether there is information matching the identification information received in S312 (S313), and may determine whether authentication of the new device 350 is granted. When identification information of the new device 350, connected to the IoT network 341 by the consumer, is present in the first database 330, the first database 330 may send an authentication confirmation message to the second database 340 (S314).

When the authentication confirmation message is received, the second database 340 may transmit an authentication confirmation message to the new device 350 (S315), and may generate a communications channel between the new device 350 and the IoT network 341 (S316), to transmit and receive data (S317). In this case, personal information such as a consumer, a consumer living environment, or the like, may be shared in the IoT system, so the communications channel, generated in S316, may be generated by a transport layer security (TLS) or datagram transport layer security (DTLS) protocol.

In FIGS. 13 and 14, identification information, transmitted using the device registration tool 310, may be stored in the first database 330 operated by the module manufacturer. Thus, even when information stored in the second database 340 of the IoT network is unintentionally damaged or hacked, authentication of the new device 350 may proceed without a problem using information stored in the first database 330. In an exemplary embodiment of the inventive concept, the identification information, stored in the first database 330, may also be stored in the second database 340.

Figure 15:
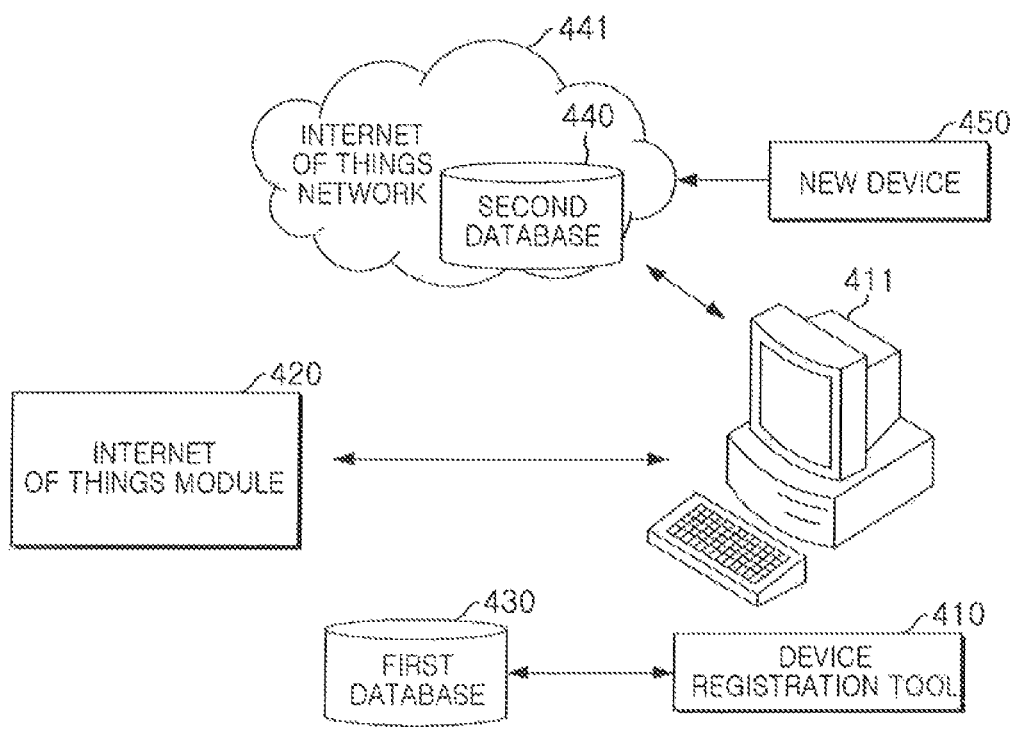
FIGS. 15 to 16 are views illustrating authentication and registration procedures of a device according to an exemplary embodiment of the inventive concept.
Figure 16:
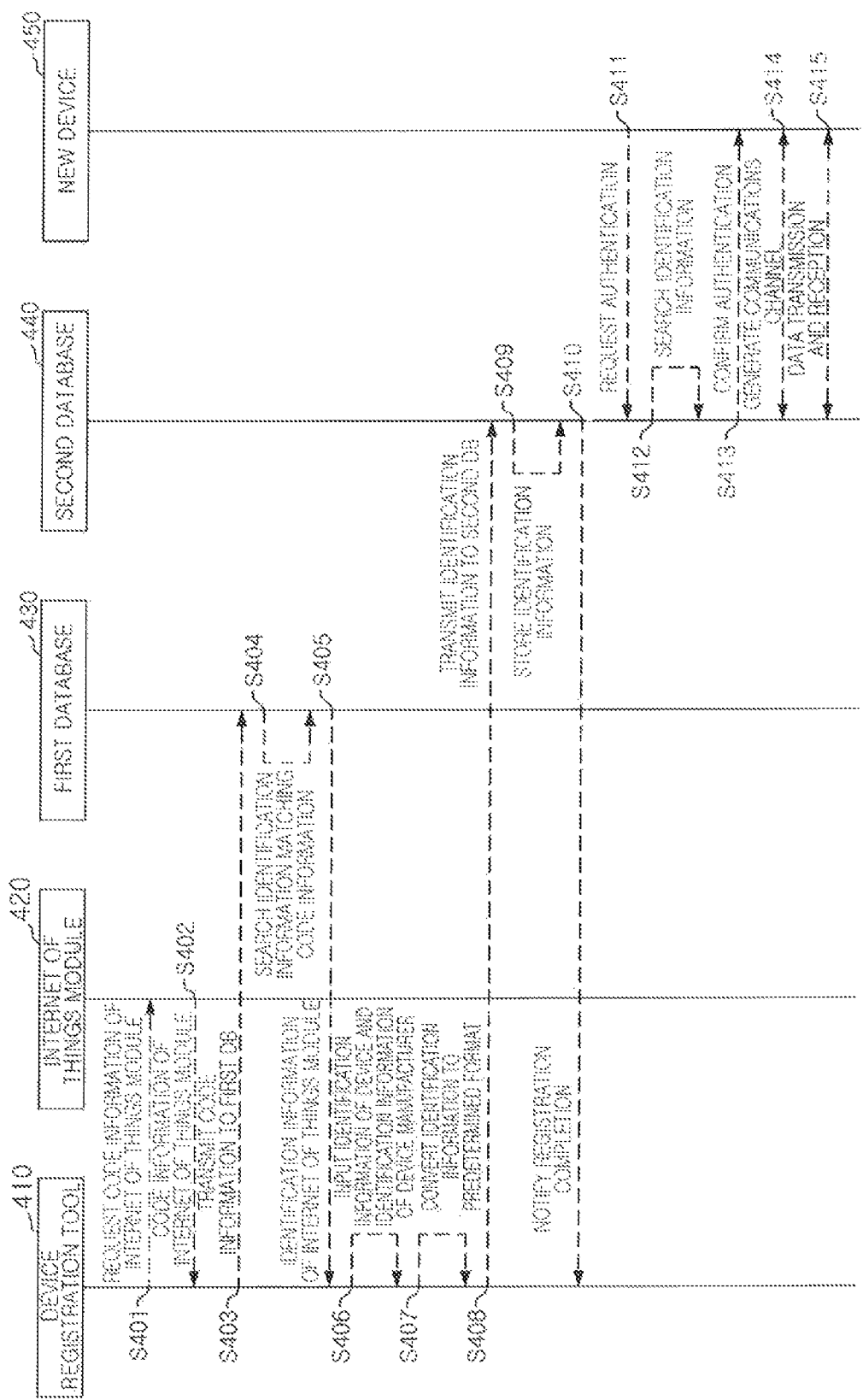

FIGS. 15 to 16 are views illustrating authentication and registration procedures of a device according to an exemplary embodiment of the inventive concept.

First, referring to FIG. 15, a computer device 411 and an IoT module 420 may be connected to communicate with each other, and a device registration tool 410 may be executed in the computer device 411. In FIG. 15, the computer device 411 may be a computer operated by a device manufacturer. The computer device 411 may be connected to communicate with a first database 430, operated by a module manufacturer, and a second database 440 included in an IoT network 441. Similar to FIGS. 11 and 12, in the present exemplary embodiment illustrated with reference to FIGS. 15 and 16, by an authentication procedure performed by the module manufacturer, identification information of the IoT module 420 and information of a two-dimensional code (for example, a QR code or a barcode) printed on the IoT module 420 may be stored in the first database 430.

In FIG. 15, the device manufacturer may purchase the IoT module 420 from the module manufacturer, and then may extract code information by recognizing a two-dimensional code printed on the IoT module 420 using the computer device 411. The code information may be transmitted to the first database 430 by the device registration tool 410, and the first database 430 may search identification information corresponding to the code information, and may transmit the identification information corresponding thereto to the computer device 411. In other words, identification information of the IoT module 420 may not be stored in the IoT module 420, purchased by the device manufacturer. Instead, the device manufacturer may receive identification information of the IoT module 420 from the first database 430, operated by the module manufacturer, by scanning the two-dimensional code included in the IoT module 420. Hereinafter, a further detailed operation will be described with reference to FIG. 16.

Referring to FIG. 16, an operation, according to an exemplary embodiment of the inventive concept, may begin with the device registration tool 410 requesting and receiving code information of the IoT module 420 from the IoT module 420 (S401 and S402). According to an exemplary embodiment of the inventive concept, the two-dimensional code, printed on the IoT module 420, is scanned by a code recognition device (a camera, a barcode recognizer, or the like), connected to a computer device (e.g., 411), in which the device registration tool 410 is executed, so that the device registration tool 410 may read the code information of the IoT module 420.

The device registration tool 410 may transmit the code information, read from the IoT module 420, to the first database 430 (S403). As described previously, the first database 430 may hold identification information of the IoT module 420 and code information of the IoT module 420, by the registration procedure described with reference to FIGS. 13 and 14. The database 430 may search the identification information, corresponding to the code information received in S403 (S404), and may transmit the identification information of the IoT module 420 to the device registration tool 410 (S405).

The device registration tool 410 may input the identification information of a device in which the IoT module 420 is mounted, or in which the IoT module 420 is to be mounted, and/or identification information of the device manufacturer (S406). S406 may be performed by the device manufacturer. The device registration tool 410 may encode or convert the identification information received in S405 and the identification information input in S406 in a predetermined format (S407), and may transmit the encoded identification information to the second database 440 (S408). The second database 440 may store the identification information received in S408 (S409), and may inform the device registration tool 410 of successful registration of the device with the IoT module 420 mounted therein (S410).

In the present exemplary embodiment illustrated in FIGS. 16, S411 to S415 may be operations executed while a consumer purchases and uses a new device 450 with the IoT module 420 mounted therein. When the consumer connects the new device 450 to the IoT network 441, the new device 450 may send an authentication request to the second database 440 connected to the IoT network 441 (S411). In S411, the new device 450 may send identification information of the new device 450, identification information of the IoT module 420 mounted in the new device 450, or the like, together with the authentication request.

When the authentication request is received, the second database 440 searches whether there is information matching the identification information received in S411 (S412), and may determine whether authentication of the new device 450 is granted. When the identification information of the new device 450, to be connected to the IoT network 441 by the consumer, is present in the second database 440, the second database 440 may send an authentication confirmation message to the new device 450 (S413). When authentication confirmation is completed, a communications channel is generated between the IoT network 441 and the new device 450 (S414), and data transmission and reception may be performed (S415). In this case, personal information such as consumer information, information on a consumer's living environment, or the like, may be shared in the IoT system, so the communications channel, generated in S414, may be generated by a TLS or DTLS protocol.

As set forth above, according to exemplary embodiments of the inventive concept, when authentication is requested to an IoT service by a new IoT module or a new device including an IoT module, with respect to a database storing information of IoT modules or devices that can be authenticated, an authentication process for the IoT module or the new device may be performed by transmitting an authentication request. Thus, regardless of manufacturer, an authentication procedure of an IoT module or a device with an IoT module mounted therein may be simply performed, so scalability of an IoT system may be increased without reduction in a security performance and convenience of a user, and the number of possible device manufacturers may be increased.

While the inventive concept has been shown and described above with reference to exemplary embodiments thereof, it will be apparent to those of ordinary skill in the art that modifications and variations in form and details could be made thereto without departing from the spirit and scope of the inventive concept, as set forth by the following claims.

What is claimed is:

1. An Internet of Things (IoT) module mounted in a device, comprising
    a memory configured to store first identification information of the IoT module;
    a communications unit connected to an IoT network; and
    a port including an interface to be connected to an external device;
    wherein the communications unit is configured to transmit the first identification information of the IoT module and a second identification information of the device to a database for the IoT network so that the first identification information and the second identification information is used for an authentication procedure for the IoT module and the device executed in the database.

2. The IoT module of claim 1, wherein, when the IoT module is connected to the IoT network by a user of the device, the communications unit transmits an authentication request for the IoT network to the database and sets communications with the IoT network.

3. The IoT module of claim 1, wherein the second identification information of the device includes at least one of a serial number assigned to the device, a product name of the device, or identification information assigned to a manufacturer of the device.

4. The IoT module of claim 1, wherein the first identification information of the IoT module includes at least one of certificate identification information stored in the IoT module or a serial number assigned to the IoT module.

5. The IoT module of claim 1, wherein the first identification information of the IoT module is stored in a two-dimensional code, printed on the IoT module.

6. The IoT module of claim 1, wherein, the external device is a device to use a device registration tool to register the identification information of the IoT module in the database.

7. The IoT module of claim 1, wherein, after the communication unit transmits an authentication request to the database, by the IoT network, the communication unit receives an authentication confirmation message from the database, by the IoT network.

8. A device registration tool to store first identification information of an IoT module included in a device, wherein,
    the device registration tool is executed on an external device connected to the IoT module, by a port included in the IoT module;
    the device registration tool obtains the first identification information of the IoT module; and
    the device registration tool transmits the first identification information of the IoT module to a database for an IoT network.

9. The device registration tool of claim 8, wherein the device registration tool obtains second identification information of the device, and transmits the second identification information to the database.

10. The device registration tool of claim 8, wherein the device registration tool obtains the first identification information of the IoT module, stored in a memory of the IoT module.

11. The device registration tool of claim 8, wherein the device registration tool obtains the first identification information of the IoT module, by scanning a two-dimensional code printed on the IoT module.

12. The device registration tool of claim 8, wherein the the device registration tool transmits the first identification information of the IoT module to the database, by a network accessed by the external device.

13. An Internet of Things (IoT) module mounted in a device, comprising:
- a memory configured to store first identification information of the IoT module;
- a communications unit connected to an IoT network; and
- a port including an interface to be connected to an external device on which a device registration tool to store the first identification information of the IoT module in a database for the IoT network is executed;
- wherein the port transmits the first identification information of the IoT module to the external device, in response to a request from the device registration tool.

14. The IoT module of claim 13, wherein when the IoT module embedded in a new device, not authorized by the database, is connected to the IoT network, the communications unit transmits the first identification information of the IoT module and a second identification information of the new device to the database, with an authentication request.

15. The IoT module of claim 14, when the new device receives an authentication confirmation message, the communications unit generates a communication channel between the IoT module and the IoT network.

* * * * *